United States Patent [19]

Frisch et al.

[11] 4,075,181

[45] Feb. 21, 1978

[54] POWDER COATING COMPOSITIONS BASED ON A CYCLIC NITRILE COMPOUND

[75] Inventors: Kurt Charles Frisch, Grosse Ile, Mich.; Donald Henry Russell, Cherry Hill, N.J.

[73] Assignee: Atlantic Richfield Company, Los Angeles, Calif.

[21] Appl. No.: 643,270

[22] Filed: Dec. 22, 1975

[51] Int. Cl.$^2$ .................... C08G 18/04; C08G 71/02; B05D 1/06
[52] U.S. Cl. .................. 260/77.5 B; 260/77.5 AB; 260/77.5 AC; 260/77.5 CR; 260/77.5 R; 427/195
[58] Field of Search ................ 260/77.5 R, 77.5 CR, 260/77.5 B, 2.5 A

[56] References Cited

U.S. PATENT DOCUMENTS

| | | | |
|---|---|---|---|
| 3,562,217 | 2/1971 | Zalenski et al. | 260/77.5 R |
| 3,578,639 | 5/1971 | Sheffer | 260/77.5 R |
| 3,702,320 | 11/1972 | Fritok | 260/77.5 B |
| 3,741,943 | 6/1973 | Sekmakas | 260/77.5 CR |
| 3,746,667 | 7/1973 | Dieter et al. | 260/2.5 AB |
| 3,766,147 | 10/1973 | Wohlgemuth | 260/77.5 R |
| 3,855,159 | 12/1974 | Russell | 260/2.5 A |
| 3,856,720 | 12/1974 | Dieter et al. | 260/77.5 R |
| 3,897,397 | 7/1975 | Russell et al. | 260/77.5 R |
| 3,932,361 | 1/1976 | Russell et al. | 260/77.5 B |

OTHER PUBLICATIONS

Sinclair Petrochemicals, Inc., Product Data Bulletin No. 101: "SMA Resins," Jan. 1, 1964.

*Primary Examiner*—H.S. Cockeram
*Attorney, Agent, or Firm*—Coleman R. Reap

[57] ABSTRACT

A shelf-stable polymer-producing coating powder composition is presented comprised of a cyclic nitrile compound and an organic compound containing at least two carboxyl or carboxylic acid anhydride groups or at least one carboxyl group and one carboxylic anhydride group, and a condensation-rearrangement catalyst. The preferred cyclic nitrile compounds are the cyclic nitrile carbonates, for example, adipodi(nitrile carbonate), and the preferred organic compounds are anhydride-containing polymers, for example, styrene-maleic anhydride copolymer. The coating powder composition preferably has a particle size of about 50 to 250 microns.

10 Claims, No Drawings

POWDER COATING COMPOSITIONS BASED ON A CYCLIC NITRILE COMPOUND

BACKGROUND OF THE INVENTION

This invention relates to powder coating compositions and more particularly to a coating powder composition capable of holding a high static electric charge and which forms a durable polymeric film coating upon heating.

Since their introduction in the early 1950's, powdered coating compositions and techniques have become increasingly popular in the coating industry. This is due to the several advantages which this coating method offers over conventional solvent-type coating methods. Today there are many coating powder compositions available on the market both in the thermoplastic and thermoset polymer categories. In spite of the fact that many polyamide and polyimide film coatings have excellent physical properties, polyamide and polyimide-producing powder coating compositions containing isocyanates are not, in general, available on the market. A principal reason for the lack of availability of such isocyanate-containing powder coating compositions is that the condensation reaction between isocyanates and compounds containing organic acids or acid anhydrides is rapid, particularly in the presence of a catalyst, and, thus, they do not exhibit good storage stability even in the powdered form. Moreover, isocyanates have a great propensity to react with water so that great care must be taken to prevent a powder coating material comprised of conventional isocyanates and organic acid or acid anhydride containing-compounds from coming into contact with moisture, even the moisture present in the air. Furthermore, the highly toxic nature of isocyanates has discouraged the general use of isocyanates in powder coating compositions. In spite of these drawbacks, there is a continuing need for new coating powders which have excellent physical properties even though they are made from isocyanates or isocyanate-type compounds.

SUMMARY OF THE INVENTION

It has now been discovered that polyamide-, polyimide-, or poly(amide-imide)-producing powder coating compositions not having the above disadvantages can be prepared from cyclic nitrile compounds. Films made from these compositions have physical and chemical properties as good as or better than those prepared by solvent techniques. Cyclic nitrile compounds are disclosed in U.S. Pat. Nos. 3,480,595; 3,531,425; and 3,560,492 and the disclosures of these patents are incorporated herein by reference.

U.S. Pat. No. 3,897,397 discloses polyurethane-producing powder coating compositions comprised of a cyclic nitrile compound and a polyol and the disclosure of this patent is incorporated herein by reference.

It is an object of the invention to present a novel shelf-stable powder coating composition prepared from a cyclic nitrile compound.

It is another object of the invention to present a shelf-stable polyamide-, polyimide- or poly(amide-imide)-producing coating composition in powder form containing a cyclic nitrile compound.

It is another object of the invention to present a relatively non-toxic polyamide-, polyimide- or poly(amide-imide)-producing powder coating composition.

It is another object of the invention to present a polyamide-, polyimide-, or poly(amide-imide)-producing powder coating composition which does not require special storage or handling procedures.

It is another object of the invention to present a polyamide-, polyimide-, or poly(amide-imide)-producing powder coating composition which lends itself well to electrostatic coating techniques.

It is another object of the invention to present a polyamide-, polyimide-, or poly(amide-imide)-producing powder coating composition which, when coated onto a substrate, forms an attractive, durable, coating.

These and other objects of the invention will become apparent from the following description and examples.

DESCRIPTION OF THE INVENTION

The coating powder compositions of the present invention are comprised of one or more cyclic nitrile compounds having the structural formula

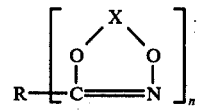

wherein X is carbonyl, thionyl or oxalyl, n is at least 2, and R is an organic radical free of reactive hydrogen groups, and an organic compound containing two or more carboxyl or carboxylic acid anhydride groups or at least one carboxyl group and at least one carboxylic acid anhydride group. A condensation-rearrangement catalyst may optionally be incorporated into the powder coating compositions. The powder coating composition has a particle size of about 10 to 500 microns and preferably about 50 to 250 microns. According to a preferred embodiment, the cyclic nitrile compound is a cyclic nitrile carbonate, the organic acid or acid anhydride component reactive therewith is polymeric, particularly a polymeric anhydride, and a condensation-rearrangement catalyst is included in the formulation. A preferred polymeric anhydride is styrene-maleic anhydride copolymer.

The term cyclic nitrile compound is used to describe compounds containing

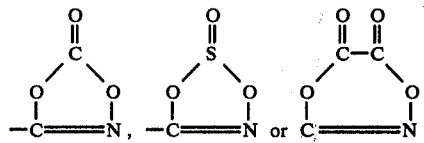

groups.

According to a preferred embodiment of the invention, the cyclic nitrile compound is combined with one or more of the organic acid- and/or organic acid anhydride-containing compounds described below, and optionally a catalyst, to produce a fine powdered mixture. The ingredients may be combined and ground to the desired size or they may be separately ground and subsequently combined in the desired ratios. It is preferable to mix the ingredients and then grind them, as this procedure will provide a greater degree of mixing. It is important that the reactive components be substantially homogeneously dispersed in the composition so that the condensation-rearrangement reaction can proceed substantially to completion to produce a tough, continuous polymeric film of uniform molecular weight.

THE CYCLIC NITRILE COMPOUNDS

The cyclic nitrile compounds used in the invention have the structure

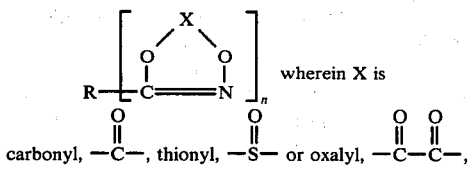

wherein X is carbonyl, $-\overset{O}{\underset{\|}{C}}-$, thionyl, $-\overset{O}{\underset{\|}{S}}-$ or oxalyl, $-\overset{O}{\underset{\|}{C}}-\overset{O}{\underset{\|}{C}}-$, $n$ is at least 2 and R is an organic radical having from 2 to about 200,000 carbon atoms and is free of reactive hydrogens as determined by the Zerewitinoff test. Generally, R will consist essentially of carbon and hydrogen but there can be included therein other elements as well, as long as they do not materially affect the radical's basic characteristic of being non-interfering in condensation-rearrangement reactions between cyclic nitrile compounds and organic acid or acid anhydride groups. Examples of such non-interfering groups are alkoxy, nitro, and halo groups. R can be saturated or ethylenically or acetylenically unsaturated aliphatic radicals, saturated or ethylenically unsaturated cycloaliphatic radicals, or aromatic radicals, including alkaryl, aralkyl, and fused ring aromatic radicals.

R often contains from 2 to 50 carbon atoms when it is aliphatic and from 6 to 30 carbon atoms when it is aromatic. When R has a content in this range, it preferably contains 2 to 12 carbon atoms when aliphatic and 6 to 18 carbon atoms when aromatic. R may also be of much higher molecular weight and may contain up to 200,000 or more carbon atoms. Cyclic nitrile compounds in which R has a high molecular weight may be prepared, for instance, by polymerizing unsaturated cyclic nitrile compounds, such as acrylonitrile carbonate. The preparation of cyclic nitrile compounds of this type is disclosed in U.S. Pat. No. 3,480,595, the disclosure of which is incorporated herein by reference.

The number of cyclic nitrile functional groups present in the cyclic nitrile compounds used in the invention is at least 2 and may vary to as high as 100,000 or more per molecule. Thus, $n$, in the above structural formula, is at least 2. In preparing high molecular weight polymers, it is usually desirable that $n$ be about 2. In the preferred embodiment of the invention, $n$ varies from 2 to about 6.

The preparation of the cyclic nitrile compounds useful in the invention forms no part of the invention, and one desiring to explore their preparation may refer to the above-mentioned patents and U.S. Pat. Nos. 3,507,900, 3,609,163, and 3,658,805, all of which are incorporated herein by reference.

Typical of the aliphatic cyclic nitrile compounds useful in the invention are:

1. Saturated aliphatic and cycloaliphatic compounds such as 1,2-ethane di(nitrile carbonate); 1,4-butane di(nitrile sulfite); 1,20-eicosane di(nitrile oxalate); 1,40-tetracontane di(nitrile carbonate); 5-ethyl-1,16-hexadecane di(nitrile carbonate); 1,3,5-pentane tri(nitrile sulfite); 1,4,6,10-decane tetra(nitrile carbonate); 6-methyl-1,5,8-octane tri(nitrile oxalate); 1,4-cyclohexane di(nitrile carbonate); 2-ethyl-1,3,5-cyclohexane tri(nitrile carbonate); etc.

2. Unsaturated aliphatic and cycloaliphatic compounds such as 1,2-ethene-di(nitrile carbonate); 1,4-butene-2-di(nitrile sulfite); 1,6,9-nonene-2-tri(nitrile oxalate); 3-propyl-1,5,7-heptene-2-tri(nitrile carbonate); 1,4-butyne-2-di(nitrile carbonate); 1,6-hexyne-2-di(nitrile carbonate); 1,4-cyclo hexene-2-di(nitrile carbonate); etc.

3. Aromatic compounds such as benzene-1,3-di(nitrile carbonate); benzene-1,4-di(nitrile sulfite); 1,4-dimethylbenzene-2,5-di(nitrile carbonate); and 1,3-diethylbenzene-2,4-di(nitrile oxalate); methylbenzene-di(nitrile carbonate); 1-benzylbenzene-2,4-di(nitrile carbonate); naphthalene-1,7-di(nitrile carbonate); 1,2,3,4-tetrahydronaphthalene-di(nitrile carbonate); 2,2-diphenylpropane-p,p'-di(nitrile carbonate); diphenylmethane-p,p'-di(nitrile carbonate); anthracene-2,8-di(nitrile carbonate); 1,2-diphenylethane-p,p'-di(nitrile carbonate); biphenyl-di(nitrile carbonate); 1,2-diphenylethane-o,o'-di(nitrile oxalate); stilbene-p,p'-di(nitrile carbonate); and stilbene-o,o'-di(nitrile sulfite), etc.

Although cyclic nitrile sulfites and cyclic nitrile oxalates function as well as and sometimes better than cyclic nitrile carbonates, they are not as suitable as cyclic nitrile carbonates since the sulfites produce sulfur dioxide, an obnoxious and toxic gas, and the oxalates produce carbon monoxide, also a very toxic gas. Since the carbonates, upon reaction, release harmless and odorless carbon dioxide, these are much more suitable for general use. Thus, the preferred cyclic nitrile compounds are the saturated aliphatic cyclic nitrile carbonates in which R contains 2–12 carbon atoms such as 1,2-ethane di(nitrile carbonate); 1,4-butane di(nitrile carbonate); and 1,4,8-octane tri(nitrile carbonate).

THE ORGANIC ACID/ANHYDRIDE COMPONENT

The organic acids or acid anhydrides useful in the invention include both monomeric and polymeric compounds containing at least two functional groups per molecule selected from carboxyl groups, carboxylic acid anhydride groups or mixtures of these. By mixtures of the acids or anhydrides is meant a total of at least two functional groups including at least one carboxyl group and at least one carboxylic anhydride group are present on each molecule. The term monomeric, used above, is intended to cover both saturated organic compounds which polymerize by means of condensation and ethylenically unsaturated organic compounds which, in addition to their ability to condense with isocyanate groups or isocyanate precursors, are also capable of undergoing addition polymerization alone or with other ethylenically unsaturated compounds. The acid or anhydride containing-compounds may be substituted with substituent groups which will not interfere with the reactivity of the organic acid component. Non-interfering radicals include halogen, nitro, hydroxy, etc. groups.

Monomeric compounds useful in the compositions of the invention include saturated aliphatic and cycloaliphatic acids and acid anhydrides, such as oxalic acid, malonic acid, glutaric acid, adipic acid, azelaic acid, 1,14-tetradecanedioic acid, 3-methyl-1,6-hexanedioic acid, 1,20-eicosanedioc acid, 2-chloro-1,4-butanedioic acid, 5-bromo-1,9-nonanedioic acid, 1,3,7-heptanetrioc acid, 3-ethyl-1,5,10-decanetrioic acid, malic acid, citric acid, tartaric acid, 1,4-cyclohexane dicarboxylic acid, 1,8-decahydronaphthalenedicarboxylic acid, tetrahydro-2,5-dioxofuranpentanoic acid, etc.; unsaturated aliphatic and cycloaliphatic mono- or polyacids and anhydrides such as fumaric acid, 1,6-hex-2-enedioic acid, maleic anhydride, oleic acid, 2,3-dimethylmaleic anhydride, 1,4-cyclohex-2-enedicarboxylic acid, etc., aromatic polyacids and anhydrides, such as terephthalic acid, pyromellitic anhydride, trimellitic acid, etc.

Polymeric compounds useful in the compositions of the invention include homopolymers and copolymers containing pendant carboxyl or carboxylic anhydride groups or mixtures of these groups. Typical polymeric compounds which are useful in the invention are polyacrylic acid, polymethacrylic acid, styrene-maleic anhydride copolymer, etc. These compounds often have number average molecular weights up to 1,000,000 or more. Preferred polymeric materials are those having a number molecular weight of about 1000 to 50,000, particularly those having number average molecular weights of about 1000 to 10,000. Some polymers, such as styrene-maleic anhydride copolymer often contain both anhydride and carboxyl groups due to partial hydrolysis.

The preferred organic acid- or anhydride-containing compounds are the polymeric compounds, particularly styrene-maleic anhydride having a number average molecular weight of about 1000 to 10,000.

The functionality of the cyclic nitrile component is at least two. The degree of cross-linking of the product will depend upon the functionality of both the cyclic nitrile component and the organic acid- or anhydride-containing component. Substantially linear products can be prepared if the functionality of both units is close to two, i.e., each molecule contains approximately two functional groups. If a more highly cross-linked product is desired the functionality of one or both components can be increased until the desired cross-link density is achieved. In general, it is preferred that the cyclic nitrile compounds used have a functionality of two and the functionality of the organic acid or acid anhydride component be varied since it is much more economical to prepare organic polyfunctional acids or anhydrides than polyfunctional cyclic nitrile compounds.

The ratio of cyclic nitrile compound to organic acid or acid anhydride compound may vary depending upon the desired properties of the coating compound being prepared and the functionality of the reacting materials. In general, it is desired to use amounts of cyclic nitrile compound and organic acid or acid anhydride compound that will provide a ratio of cyclic nitrile functional groups to total organic acid or acid anhydride functional groups of about 0.7 to 10:1 and preferably about 0.7 to 1.4:1.

The condensation-rearrangement reaction between the cyclic nitrile component and the organic acid- or acid anhydride-containing component may be carried out by thermal initiation; however, it is usually preferred to add a catalyst to the formulation to facilitate reaction at lower temperatures and in shorter periods of time.

Suitable catalysts for the compositions of the invention are those generally found useful to catalyze the reaction between cyclic nitriles and reactive hydrogen-containing compounds. The following catalysts are typical of those which may be used in the compositions of the invention. The catalyst may be a basic material such as a tertiary amine, e.g., triethylamine, as disclosed in U.S. Pat. No. 3,531,425, the disclosure of which is incorporated herein by reference. Another catalyst useful in the present invention is a combination of a first metal selected from Groups III through V of the Periodic System and a second metal selected from Groups I and III and the iron series of Group VIII of the Periodic System as disclosed in U.S. Pat. No. 3,652,507, which disclosure is incorporated herein by reference. Yet another catalyst useful in the present invention is set forth in U.S. Pat. No. 3,702,320 which disclosure is also incorporated herein by reference. In accordance with this patent, a compound of aluminum, tin, titanium, zinc, bismuth or iron is used in the reaction mixture. If the compound is one of aluminum, tin, titanium or bismuth, the reaction is run in the absence of metals of Groups I, II, and the iron series of Group VIII of the Periodic System. On the other hand, if the metal compound is a compound of zinc or iron, the reaction is run in the absence of metals of Groups III through V of the Periodic System. Other catalysts useful in the present invention are the organic and inorganic fluorides, disclosed in co-pending U.S. Pat. No. 3,766,147, and the N-oxides of amines, disclosed in co-pending U.S. Pat. No. 3,793,254, the disclosures of both of these patents are incorporated herein by reference. The preferred catalysts are the weak base catalysts having a pKa up to 8 such as pyridine, 2-methylpyridine, 3-methylpyridine, 2,6-dimethylpyridine, 2-dimethylaniline, diethylaniline, p-methyldiethylaniline, morpholine, N-methylmorpholine, dimethylaminoethylmorpholine, N-ethylmorpholine, and N,N-dimethylaniline, etc. It is generally preferred to avoid the use of strongly basic catalysts, i.e., those having a pKa greater than 8 because they cause the reaction to proceed vigorously with the possible result that some carbon dioxide may be trapped in the product which may result in the production of a porous or foamed coating.

The catalyst, when present, is used at a concentration of about 0.001 to 10% and preferably about 0.01 to 2.0%, based on the total weight of cyclic nitrile compound and organic acid- and/or acid anhydride-containing compound in the formulation.

In addition to the essential components, pigments, flow improvement agents and other property modifying materials may be included in the formulation. Thus, finely divided fillers such as carbon black, talcum, chipped glass fibers, etc.; colorants; surfactants such as silicone oils; emulsifiers; etc. may be added to the formulation. Similarly, other additives such as cross-linking agents, chain transfer agents, etc. may be added to the formulation to further modify the coating film.

It may be desirable to include one or more polyol and/or epoxide components in the compositions of the invention where it is desired to vary the properties of the product. For instance, the flexibility, and toughness of the product may be varied by incorporating reactive polyols or epoxides into the powder coating composition. It is preferred that the amount of polyol and/or epoxide added to the composition not exceed about 50% of the total weight of components present in the composition which are reactive with cyclic nitrile compounds. In general, the polyol and/or epoxide additives, when incorporated into the product formulation, are desirably added in an amount of about 5 to 35%, and most preferably about 10 to 25%, based on the total weight of components in the formulation which are reactive with cyclic nitrile compounds.

The particle size of the powder coating compositions of the invention is such that most of the composition has a particle size range between about 10 and 500 microns and it is preferred that most of the composition be in the particle size range of about 50 to 250 microns. The various components of the powder coating composition may be ground separately or combined and ground together. Since heat initiates reaction between the cyclic nitrile groups and the polyol or polythiol groups, it is preferred to grind the ingredients of the powder formulation separately or under conditions such that excess heat is not produced. One particularly suitable method is freeze grinding in which the material is frozen before grinding to minimize the temperature rise of the mixture. There are many well known suitable methods for grinding coating materials to a size suitable for powder coating techniques and the method of size reduction of the powder coatings prepared by this invention forms no part of the invention.

The powder coating compositions of the invention are particularly suitable for use in electrostatic powder spray or fluid bed systems because they are capable of holding a high electric charge and are easily comminuted.

In preparing the powder coating compositions of the invention, the cyclic nitrile component and the organic acid- and/or organic acid anhydride-containing compound and catalyst as well as other desired additives are blended thoroughly in the proper proportions. As stated above, the various components may be preground separately or the mixture of components may be ground. As previously stated, it is often desirable to combine the blending and grinding steps as this insures that a homogeneous mixture is obtained. The ground and blended coating composition is then ready for use or it may be stored for indefinite periods of time, preferably in moisture-proof containers at room temperature.

To form coatings on the desired substrates, the powder coating compositions of the invention are applied by any of the known powder coating techniques including flock coating, rolling, fluidized bed, the various electrostatic methods, etc. The powder coating is transformed into a continuous durable coating by heating the coated part to a temperature of about 200° to 425° F. The coated part is maintained at this temperature until the desired degree of curing of the coating composition has occurred. The coated article is then cooled and ready for immediate use or further treatment, as desired.

The following examples illustrate preferred embodiments of the invention. Parts and percentages are expressed on a weight basis unless otherwise indicated.

EXAMPLE I 12.15 gms of adipodi(nitrile carbonate) (ADNC), 22.01 gms of styrene-maleic anhydride having a molecular weight of 1600, a styrene-maleic anhydride ratio of 1:1 and an acid number of 480 and 1.0 gm of dimethylaminoethylmorpholine are dissolved in methylethyl ketone, freeze dried, and ground in a ball mill for 2 hours. The equivalent ratio of cyclic nitrile groups to anhydride groups is 1:0.88. The particle size of the resulting mixture is less than 150 microns. The powdered mixture will remain substantially unchanged chemically after a prolonged storage period. A portion of the mixture is spread onto a substrate and baked at a temperature starting at 130° C and ending at 200° C over a 20 minute period. The resulting film is resistant to acetone and has a direct Izod impact resistance of 120 psi.

EXAMPLE II

The procedure of Example I is repeated except that polyacrylic acid is substituted for the styrene-maleic anhydride copolymer. The product will have a long storage life and produce a baked coating which has good physical properties.

EXAMPLE III

The procedure of Example I is repeated except that pyromellitic anhydride is substituted for the styrene-maleic anhydride copolymer. The resulting product will have a long storage life and produce a baked coating having good physical properties.

EXAMPLE IV

The procedure of Example I is repeated except that 8 gms of 1,4-butanediol is incorporated into the formulation. The resulting mixture will have a long storage life and produce a baked coating having a durable finish.

EXAMPLE V

The procedure of Example I is repeated except that 7 gms of diglycidyl ether of bis-phenol A is added to the formulation. The resulting mixture will have a long storage life and produce a baked coating having a glossy, durable finish.

The foregoing examples illustrate the preparation of compositions of the invention and the physical and chemical properties of films prepared from them. Although specific examples are used to describe the invention it is understood that the scope of the invention is not limited thereto but is limited only by the breadth of the appended claims.

We claim:

1. A shelf-stable powder coating composition having a particle size range such that most of the particles have a size of about 10 to 500 microns comprised of
   A. 5 to 95 parts by weight of a cyclic nitrile compound having the structural formula

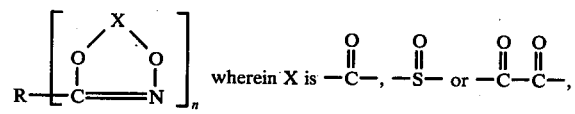

R is an organic radical free from reactive hydrogens as determined by the Zerewitinoff Test and $n$ is at least 2,
   B. 5 to 95 parts by weight of a member selected from the group consisting of styrene-maleic anhydride copolymer having a number average molecular weight of about 1,000 to 10,000, pyromellitic anhydride and trimellitic anhydride,
   C. 0.001 to 10 parts per 100 total parts of (A) and (B) of a basic condensation-rearrangement catalyst having a pKa up to 8.

2. The composition of claim 1 having a major particle size range of about 50 to 250 microns.

3. The composition of claim 2 wherein R is a hydrocarbon radical.

4. The composition of claim 3 wherein $n$ is 2 to 6.

5. The composition of claim 4 wherein X is

6. The composition of claim 5 wherein the cyclic nitrile compound is adipodi(nitrile carbonate).

7. The composition of claim 1 wherein (A) is present in an amount of about 10 to 90 parts and (B) is present in an amount of about 90 to 10 parts per 100 parts of total (A) and (B).

8. The composition of claim 7 wherein the ratio of cyclic nitrile functional groups to total carboxyl and carboxylic acid anhydride groups is about 0.7 to 10:1.

9. The composition of claim 7 additionally containing 10 to 50 parts by weight of a polyol or epoxide per 100 parts by weight of (B).

10. A shelf-stable powder coating composition having a particle size of about 50 to 250 microns comprised of A. 10 to 90 parts by weight of adipodi(nitrile carbonate), B. 90 to 10 parts by weight of styrene-maleic anhydride copolymer having a number average molecular weight of about 1,000 to 10,000, and C. 0.1 to 2 parts per 100 parts of (A) and (B) of a basic condensation-rearrangement catalyst having a pKa up to 8.

* * * * *